United States Patent [19]

Kanoh

[11] Patent Number: 4,953,115

[45] Date of Patent: Aug. 28, 1990

[54] ABSOLUTE VALUE CALCULATING CIRCUIT HAVING A SINGLE ADDER

[75] Inventor: Toshiyuki Kanoh, Tokyo, Japan

[73] Assignee: NEC Corporation, Tokyo, Japan

[21] Appl. No.: 308,296

[22] Filed: Feb. 9, 1989

[30] Foreign Application Priority Data

Feb. 9, 1988 [JP] Japan .................................. 63-26565

[51] Int. Cl.[5] .............................................. G06F 7/38
[52] U.S. Cl. .............................................. 364/715.01
[58] Field of Search .................... 364/715.01, 768, 770, 364/784–786, 748

[56] References Cited

U.S. PATENT DOCUMENTS

| 4,075,704 | 2/1978 | O'Leary | 364/748 |
| 4,153,939 | 5/1979 | Kudou | 364/770 |
| 4,218,751 | 8/1980 | McManigal | 364/784 |
| 4,644,490 | 2/1987 | Kobayashi et al. | 364/748 |
| 4,807,172 | 2/1989 | Nukiyama | 364/748 |
| 4,841,467 | 6/1989 | Ho et al. | 364/748 |
| 4,849,921 | 7/1989 | Yasumoto et al. | 364/768 |

OTHER PUBLICATIONS

Elliott, J. E., "Increment-Decrement Logic" *IBM Technical Disclosure Bulletin* vol. 11 #3 pp. 297-298 Aug. 1968.

"A Realtime Microprogrammable Video Signal LSI" by Yamashina et al; IEEE International Solid-State Circuits Conference, Feb. 26, 1987.

*Primary Examiner*—Dale M. Shaw
*Attorney, Agent, or Firm*—Sughrue, Mion, Zinn, Macpeak & Seas

[57] ABSTRACT

An absolute value calculating circuit for producing an absolute value of the difference between first and second numerical values. The circuit includes a first inverter for inverting the first numerical value, a first adder for adding the inverted first numerical value and the second numerical value, and a second inverter for inverting the output of the first adder. The circiuit further includes a second adder for adding 1 to the output of the adder and a selector for selecting and outputting, as the absolute value of the difference between the first and second numerical values, either the inverted output of the first adder or the output of the second adder in accordance with a sign of the output of the first adder.

7 Claims, 1 Drawing Sheet

U.S. Patent  Aug. 28, 1990  4,953,115
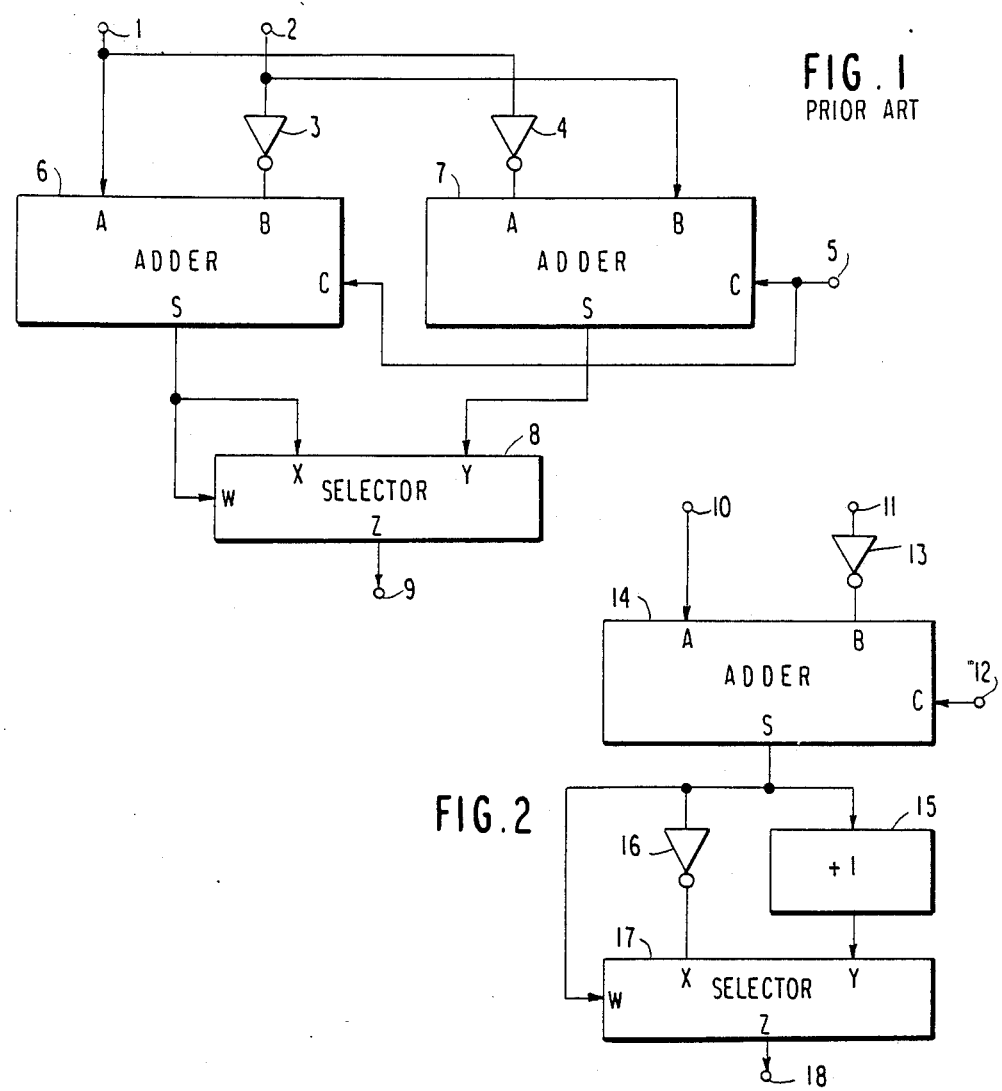
FIG. 1 PRIOR ART
FIG. 2
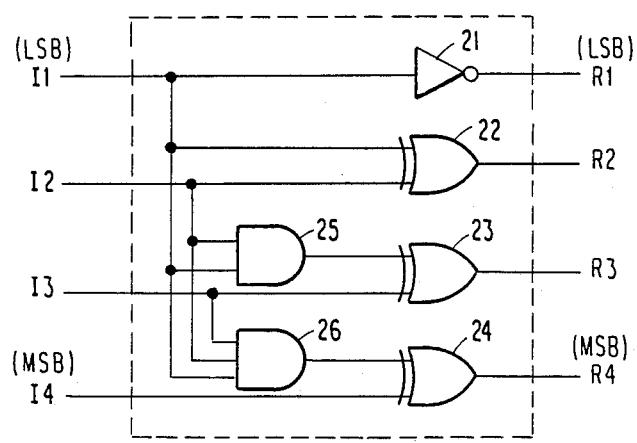
FIG. 3

ABSOLUTE VALUE CALCULATING CIRCUIT HAVING A SINGLE ADDER

BACKGROUND OF THE INVENTION

The present invention relates to a circuit for arithmetic operations and, more particularly, to an absolute value calculating circuit for producing the absolute value of a difference between two numerical values.

To code video signals, for example, arithmetic operations are frequently performed for rapidly producing the absolute value of a difference between two numerical values. An absolute value calculating circuit (referred to simply as a calculating circuit hereinafter) has been proposed in various forms in order to implement such arithmetic operations. Most of prior art calculating circuits are of the type reported by Yamashina et al in a paper entitled "A Realtime Microprogrammable Video Signal LSI" at IEEE International Solid-State Circuits Conference held at GRAND BALLROOM WEST, New York City, on Feb. 26, 1987, SESSION XV: HIGH-SPEED SIGNAL PROCESSORS, THPM 15.3. A calculating circuit of the type described in this paper has a parallel connection of two adders (or subtractors), and a selector. Assuming two input values a and b, one of the adders produces (a−b) and the other produces (b−a), and the selector selects the value of a result of calculation which is positive. A drawback with this type of calculating circuit is that the use of two adders (or subtractors) makes the construction complicated, adds to the number of circuit elements, requires a substantial area on an integrated circuit, and aggravates power consumption.

SUMMARY OF THE INVENTION

It is therefore an object of the present invention to provide an absolute value calculating circuit which is free from the drawback particular to the prior art as discussed above, and is simple in construction and is operable at a high speed.

In accordance with the present invention, an absolute value calculating circuit for producing an absolute value of a difference between a first and a second numerical value which have a predetermined bit length and are represented by 2's complement notation comprises first inverting means for inverting the first numerical value to output an inverted numerical value, first adding means for adding the second numerical value to the inverted numerical value to output an addition result, second inverting means for inverting the addition result to output a first calculation result, second adding means for adding 1 to the addition result to output a second calculation result, and selecting means for selecting and delivering as an absolute value of a difference either one of the first and second calculation results by referencing a sign of the addition result.

BRIEF DESCRIPTION OF THE DRAWINGS

The above and other objects, features and advantages of the present invention will become more apparent from the following detailed description when taken with accompanying drawings in which:

FIG. 1 is a schematic block diagram showing a prior art absolute value calculating circuit;

FIG. 2 is a block diagram shematically showing an absolute value calculating circuit embodying the present invention;

FIG. 3 is a circuit diagram showing a specific construction of a plus one circuit included in the calculating circuit of FIG. 2.

DETAILED DESCRIPTION OF A PREFERRED EMBODIMENT

To better understand the present invention, a brief reference will be made to a prior art calculating circuit of the type using two adders, shown in FIG. 1. In the figure, the calculating circuit has a first, second and third input terminal 1, 2 and 5, a first and a second inverter 3 and 4, a first and a second adder 6 and 7, a selector 8, and an output terminal 9. Numerical values (assumed to be a and b) having the same predetermined bit length and represented by 2's complement notation are applied to the first and second input terminals 1 and 2, respectively. The numerical values b and a are inverted to values $\bar{b}$ and $\bar{a}$ respectively by the first and second inverters 3 and 4 and then fed to a terminal B of the first adder 6 and a terminal A of the second adder 7. Data "1" adapted for carrying is applied to each terminal C of the adders 6 and 7 via the third input terminal 5 of the calculating circuit, so that the adders 6 and 7 perform respectively arithmetic operations of $(a+\bar{b}+1)$ and $(\bar{a}+b+1)$. Generally, a subtraction of $(c-d)$, where c and d are binary numbers, is replaced with an addition of $(c+\hat{d})$, where $\hat{d}$ is a 2's complement of d. A 2's complement of a certain binary number d is equal to a number $(\bar{d}+1)$ produced by adding 1 to $\bar{d}$ which is an inverted version of d. By applying this relationship to the results of calculations performed by the adders 6 and 7, it will be seen that the first adder 6 outputs $(a+\bar{b}+1)=(a+\hat{b})=(a-b)$ while the second adder 7 outputs $(\bar{a}+b+1)=(b-a)$, respectively. In this instance, a carry output is not used with the adders 6 and 7. These two results of subtraction are individually fed to terminals X and Y of the selector 8 via terminal S of the adders 6 and 7, while the sign bit (most significant bit) of the output $(a-b)$ of the adder 6 is delivered to a select terminal W of the selector 8. When the sign bit is "1", $(a-b)$ is smaller than 0 and, hence, the selector 8 outputs $(b-a)$ which is the output of the adder 7. Conversely, when the sign bit is "0", the selector 8 outputs $(a-b)$.

Referring to FIG. 2, a calculating circuit embodying the present invention is shown in a schematic block diagram. As shown, the calculating circuit has a first to a third input terminals 10 to 12, a first and a second inverter 13 and 16, an adder 14, a plus one circuit 15 for adding 1 to input data, a selector 17, and an output terminal 18. Two numerical values (assumed to be x and y) having the same bit length and represented by 2's complement notation as with the prior art are individually applied to the input terminals 10 and 11. While the numerical value x is directly fed to a terminal A of the adder 14, the numerical value y is inverted by the inverter 13 and then fed to a terminal B of the adder 14. In accordance with the present invention, the terminal C of the adder 14 heretofore used to receive a numerical value adapted for carrying via the third input terminal 12 is not used. Hence, the adder 14 performs an addition of $(x+\bar{y})$ and produces the result on its terminal S. By adopting the previously discussed principle of 2's complements, $\bar{y}=(\hat{y}-1)$ is obtained from $\hat{y}=(\bar{y}+1)$ and therefore, the addition result $(x+\bar{y})$ of the adder 14 may be expressed as $(x-y-1)$. The addition result $(x-y-1)$ is fed to the inverter 16, plus one circuit 15, and a select terminal W of the selector 17 which responds to a sign bit of the addition result. In response, the inverter 16 produces a first calculation result $(y-x)$ by inverting $(x-y-1)$. This will be clearly understood because the inverted version $\overline{(x-y-1)}$ of $(x-y-1)$ is equal to $\{\overline{(x-y-1)}-1\}$ and because $\overline{(x-y-1)}$ is used equivalently to $-(x-y-1)$, i.e. $\overline{(x-y-1)} = -(x-y-1)-1 = (y-x)$. It will also be clear that the plus one circuit 15 produces a second calculation result $(x-y)$ because it adds 1 to $(x-y-1)$. When the sign bit of $(x-y-1)$ is "1", $(x-y-1)$ is smaller than 0 and, therefore, the selector 17 delivers the first calculation result from the inverter 16 via its output terminal Z. Conversely, when the sign bit is "0", the selector 17 feeds the second calculation result from the plus one circuit 15 via the terminal Z.

The operation of the calculating circuit having the above construction will be described by using specific numerical values. Assume that the numerical values x and y applied to the input terminals 10 and 11 are respectively $(0011_2 = 3_{10})$ and $(0101_2 = 5_{10})$ where the suffixes 2 and 10 show that their associated numbers are a binary number and a decimal number, respectively, and that in each binary number the rightmost bit is the least significant bit (LSB). Further, let the successive bits beginning at LSB be called the first bit $(b_1)$, second bit $(b_2)$, and so on. The numerical value y is inverted by the inverter 13 and then fed to the adder 14 in the form of $\bar{y} = (1010_2)$. In response, the adder 14 performs an addition of $x(0011_2) + \bar{y}(1010_2)$ to produce $(1101_2)$. This output $(1101_2)$ is routed to the plus one circuit 15 and second inverter 16, whereby a sum of $(1110_2 = 3_{10})$ and 1 and an inverted $(0010_2 = 2_{10})$ are obtained. On the other hand, "1" on the fourth bit or sign bit of the output $(1101_2)$ of the adder 14 is applied to the select terminal W of the selector 17, so that the selector 17 selects the output $(0010_2)$ of the inverter 16 based on "1" appearing on the select terminal W. Since the present invention determines the sign of the output of the adder 14 on the basis of a sign bit, it ignores a carry output of the adder 14 as the prior art.

FIG. 3 shows a specific construction of the plus one circuit 15 of the calculating circuit in accordance with the present invention. While a variety of implementations may be contemplated for adding 1 to an input value such as an adder or a counter, the plus one circuit 15 is implemented as a simple combination of logical circuits. The circuit of FIG. 3 is assumed to operate an input value having four bits, i.e. $-8(1000_2)$ to $+7(0111_2)$. It is to be noted that inputs I1 to I4 are associated respectively with LSB $(b_1)$ to sign bit $(b_4)$ of the input value. Specifically, the plus one circuit 15 consists of a first inverter 21, a first to a third Exclusive-OR (EXOR) gate 22 to 24, and a first and a second AND gate 25 and 26. When 1 is added to an input value, the first bit $b_1$ of the input value is inverted without exception. Therefore, the first inverter 21 unconditionally inverts the first bit $b_1$ to produce an output R1. On the other hand, carry at the n-th bit $b_n$ (n being a natural number and $n > 1$) occurs when all of the bits $b_1$ to $b_{n-1}$ are 1 due to the addition of 1 to the first bit $b_1$ and, hence, whether or not carry to the n-th bit $b_n$ from the lower bit occurs can be determined on the result of AND operation of all of the lower bits. The AND gates 25 and 26 are adapted to determine respectively whether or not carry to the third bit $b_3$ and carry to the fourth bit $b_4$ occur. Outputs R2 to R4 are the results of addition of the second to fourth bits $b_2$ to $b_4$ and the carry from the lower bits, respectively. This function is implemented by the EXOR's 22 to 24 which individually receive carry from the lower bits at their one input terminal and receive the second to fourth bits $b_2$ to $b_4$ at the other input terminals. Although the specific construction of FIG. 3 has been described in relation to a four-bit input value, it will be apparent that a plus one circuit operable with an n-bit input value is achievable by increasing the number of EXOR gates and AND gates.

In summary, it will be seen that the present invention provides an absolute value calculating circuit which needs only a single adder and, yet, is operable at a high speed and therefore contributes a great deal to miniature circuit configuration, power saving and cost reduction.

What is claimed is:

1. An absolute value calculating circuit for producing an absolute value of a difference between a first and a second numerical value which have a predetermined bit length and are represented by 2's complement notation, comprising:

first inverting means for inverting the first numerical value to output an inverted numerical value:

first adding means for adding the second numerical value to the inverted numerical value to output an addition result;

second inverting means for inverting the addition result to output a first calculation result;

second adding means for adding 1 to the addition result to output a second calculation result; and selecting means for selecting and delivering as an absolute value of a difference between the first and second numerical values, one of the first and second calculation results, said selecting means selecting one of the first and second calculation results in accordance with a sign of the addition result.

2. The circuit as claimed in claim 1, wherein said selecting means selects the first calculation result when the addition result is negative, and selects the second calculation result when the addition result is positive.

3. The circuit as claimed in claim 1, wherein said selecting means comprises a selector to which a sign bit of the addition result is applied as an input for selection.

4. The circuit as claimed in claim 1, wherein said second adding means comprises:

inverting means for inverting a least significant bit (first bit) of the addition result having n bits to output a first bit of the second calculation result having n bits;

first through (n−2)th AND gate means provided on a one-for-one basis with respect to the third through n-th bits of the addition result so that an i-th $(1 \leq i \leq n-2)$ AND gate means outputs a result of AND operation of the first to (i+1)th bits of the addition result as an i-th carry bit;

first Exclusive-OR gate means associated with the second bit of the addition result for outputting a result of Exclusive-OR operation of the first and second bits of the addition result as a second bit of the second calculation result; and second through (n−1)th Exclusive-OR gate means provided on a one-for-one basis with respect to the third through n-th bits of the addition result so that a j-th $(2 \leq j \leq n-1)$ Exclusive-OR gate means outputs a result of Exclusive-OR operation of the (j−1)th carry bit and the (j+1)th bit of the addition result as a (j+1)th bit of the second calculation result.

5. The circuit as claimed in claim 1, wherein said addition result is represented by first, second, third and fourth bits, and wherein said second adding means comprises an inverter for inverting the first bit which is the least significant bit, a first AND gate which receives the first and second bits, a second AND gate which receives the first, second and third bits, a first exclusive-OR gate which receives the first and second bits, a second exclusive-OR gate which receives the output of the first AND gate and the third bit, and a fourth exclusive-OR gate which receives the output of the second AND gate and the fourth bit which is the most significant bit.

6. The circuit as claimed in claim 5, wherein the output of said second adding means comprises first, second, third and fourth output bits, the first output bit representing an output of said invertor, the second output bit representing an output of the first exclusive-OR gate, the third output bit representing an output of said second exclusive-OR gate, and the fourth output bit representing an output of said third exclusive-OR gate.

7. The circuit as claimed in claim 6, wherein the first output bit is the least significant bit, and the fourth output bit is the most significant bit.

* * * * *

UNITED STATES PATENT AND TRADEMARK OFFICE
CERTIFICATE OF CORRECTION

PATENT NO. : 4,953,115

DATED : August 28, 1990

INVENTOR(S) : Toshiyuki KANOH

It is certified that error appears in the above-identified patent and that said Letters Patent is hereby corrected as shown below:

In the Abstract, line 7, delete "circiuit", and insert --circuit--.

In Column 3, line 31, delete "$3_{10}$" and insert --$\hat{3}_{10}$--.

In Column 5, line 6, delete "out put", and insert --output--.

Signed and Sealed this

Nineteenth Day of May, 1992

Attest:

DOUGLAS B. COMER

*Attesting Officer*     *Acting Commissioner of Patents and Trademarks*